(12) United States Patent
Park et al.

(10) Patent No.: US 12,074,320 B2
(45) Date of Patent: *Aug. 27, 2024

(54) NEGATIVE ELECTRODE ACTIVE MATERIAL FOR SECONDARY BATTERY AND MANUFACTURING METHOD THEREOF

(71) Applicant: NEXEON LTD., Oxfordshire (GB)

(72) Inventors: Seung Chul Park, Yuseong-gu Daejeon (KR); Eui Joon Song, Daedeok-gu Daejeon (KR); Young Tai Cho, Seo-gu Daejeon (KR); Jee Hye Park, Yuseong-gu Daejeon (KR)

(73) Assignee: Nexeon Limited, Oxfordshire (GB)

( * ) Notice: Subject to any disclaimer, the term of this patent is extended or adjusted under 35 U.S.C. 154(b) by 42 days.

This patent is subject to a terminal disclaimer.

(21) Appl. No.: 18/098,415

(22) Filed: Jan. 18, 2023

(65) Prior Publication Data

US 2023/0155119 A1 May 18, 2023

Related U.S. Application Data

(63) Continuation of application No. 16/326,873, filed as application No. PCT/KR2017/009218 on Aug. 23, 2017, now Pat. No. 11,588,152.

(30) Foreign Application Priority Data

Aug. 23, 2016 (KR) .................. 10-2016-0106852

(51) Int. Cl.
*H01M 4/38* (2006.01)
*C01B 33/021* (2006.01)
(Continued)

(52) U.S. Cl.
CPC .......... *H01M 4/386* (2013.01); *C01B 33/021* (2013.01); *H01M 4/134* (2013.01);
(Continued)

(58) Field of Classification Search
None
See application file for complete search history.

(56) References Cited

U.S. PATENT DOCUMENTS 7,879,734 B2 2/2011 Fukutani et al.
8,772,174 B2 7/2014 Green et al.
(Continued)

FOREIGN PATENT DOCUMENTS

CN 103 633 295 A 3/2014
EP 2873646 A1 5/2015
(Continued)

OTHER PUBLICATIONS

International Search Report, International Application No. PCT/KR2017/009218, issued by ISA/KR Korean Intellectual Property Office, 2 pages, Feb. 12, 2018.
(Continued)

*Primary Examiner* — Robert S Carrico
(74) *Attorney, Agent, or Firm* — Choate, Hall & Stewart LLP; Michael D. Schmitt

(57) ABSTRACT

The present invention relates to a negative electrode active material for a secondary battery and a manufacturing method thereof. A negative electrode active material, according to one embodiment of the present invention, comprises silicon-based primary particles, and a particle size distribution of the silicon-based primary particles is D10≥50 nm and D90≤150 nm. The negative electrode active material suppresses or reduces tensile hoop stress generated in lithiated silicon particles during a charging of a battery to thus suppress a crack due to a volume expansion of the silicon
(Continued)

particles and/or an irreversible reaction caused by the crack, such that the lifetime and capacity of the battery can be improved.

8 Claims, 2 Drawing Sheets

(51) Int. Cl.
    *H01M 4/02*     (2006.01)
    *H01M 4/134*     (2010.01)
    *H01M 4/1395*     (2010.01)
    *H01M 4/36*     (2006.01)
    *H01M 10/052*     (2010.01)

(52) U.S. Cl.
    CPC ......... *H01M 4/1395* (2013.01); *H01M 4/366* (2013.01); *H01M 10/052* (2013.01); *H01M 2004/021* (2013.01); *H01M 2004/028* (2013.01)

(56) References Cited

U.S. PATENT DOCUMENTS

| | | |
|---|---|---|
| 9,774,031 B2 | 9/2017 | Yoo et al. |
| 10,008,716 B2 | 6/2018 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,164,257 B2 | 12/2018 | Otsuka et al. |
| 10,388,948 B2 | 8/2019 | Abdelsalam et al. |
| 10,396,355 B2 | 8/2019 | Cho et al. |
| 10,476,072 B2 | 11/2019 | Friend et al. |
| 10,586,976 B2 | 3/2020 | Cho et al. |
| 10,673,072 B2 | 6/2020 | Cho et al. |
| 10,693,134 B2 | 6/2020 | Cho et al. |
| 10,797,303 B2 | 10/2020 | Cho et al. |
| 10,797,312 B2 | 10/2020 | Cho et al. |
| 10,822,713 B2 | 11/2020 | Friend et al. |
| 11,588,152 B2 | 2/2023 | Park et al. |
| 11,710,819 B2 | 7/2023 | Bogart et al. |
| 2005/0233213 A1 | 10/2005 | Lee et al. |
| 2006/0040182 A1 | 2/2006 | Kawakami et al. |
| 2006/0102473 A1 | 5/2006 | Bito et al. |
| 2006/0147802 A1 | 7/2006 | Yasuda et al. |
| 2008/0090152 A1 | 4/2008 | Kosuzu et al. |
| 2009/0010833 A1 | 1/2009 | Rosenband et al. |
| 2010/0009261 A1 | 1/2010 | Watanabe |
| 2010/0178565 A1 | 7/2010 | Green |
| 2010/0190061 A1 | 7/2010 | Green |
| 2010/0196760 A1 | 8/2010 | Green |
| 2013/0136986 A1 | 5/2013 | Scoyer et al. |
| 2013/0216907 A1 | 8/2013 | Rayner et al. |
| 2013/0266865 A1 | 10/2013 | Kwon et al. |
| 2014/0106230 A1 | 4/2014 | Kim et al. |
| 2014/0162131 A1 | 6/2014 | Friend et al. |
| 2014/0272592 A1 | 9/2014 | Thompkins et al. |
| 2015/0037673 A1 | 2/2015 | Zaghib et al. |
| 2015/0044571 A1 | 2/2015 | Abdelsalam et al. |
| 2015/0221936 A1 | 8/2015 | Huang |
| 2015/0303456 A1 | 10/2015 | Yoo et al. |
| 2016/0020465 A1 | 1/2016 | Jeong et al. |
| 2016/0126538 A1 | 5/2016 | Hanelt et al. |
| 2016/0197342 A1 | 7/2016 | Lee et al. |
| 2016/0308205 A1 | 10/2016 | Canham et al. |
| 2016/0359162 A1 | 12/2016 | Kim et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0119826 A1 | 4/2019 | Friend et al. |
| 2019/0148718 A1 | 5/2019 | Hatazawa et al. |
| 2019/0190020 A1 | 6/2019 | Park et al. |
| 2019/0296340 A1 | 9/2019 | Cho et al. |
| 2019/0326594 A1 | 10/2019 | Cho et al. |
| 2023/0327078 A1 | 10/2023 | Bogart et al. |

FOREIGN PATENT DOCUMENTS

| | | |
|---|---|---|
| EP | 2533331 B1 | 8/2015 |
| EP | 2966037 A1 | 1/2016 |
| JP | 2004-311429 A | 11/2004 |
| KR | 2012-0093756 A | 8/2012 |
| KR | 2012-0120034 A | 11/2012 |
| KR | 2013-0114007 A | 10/2013 |
| KR | 2013-0139554 A | 12/2013 |
| KR | 2016-0115270 A | 10/2016 |
| KR | 2016-0144573 A | 12/2016 |
| WO | WO-2004/086539 A1 | 10/2004 |
| WO | WO-2015/156620 A1 | 10/2015 |
| WO | WO-2015/163695 A1 | 10/2015 |
| WO | WO-2016/013855 A1 | 1/2016 |
| WO | WO-2016/174023 A1 | 11/2016 |

OTHER PUBLICATIONS

Malvern Instruments Worldwide, A Basic Guide to Particle Characterization, 26 Pages, (2012).
Su, L. et al., Core Double-shell Si@SiO2@C nanocomposites as anode materials for Li-ion batteries, Chemical Communication, 46:2590-2592 (2010).
Xu, R. et al., Comparison of sizing small particles using different technologies, Powder Technology, 132:145-153, (2003).

NEGATIVE ELECTRODE ACTIVE MATERIAL FOR SECONDARY BATTERY AND MANUFACTURING METHOD THEREOF

FIELD OF THE INVENTION

The present invention relates to secondary battery technology and more particularly, to a negative electrode active material for a secondary battery and a preparation method thereof.

BACKGROUND TECHNOLOGY

A secondary battery is a battery that can be charged and discharged using an electrode material having excellent reversibility, and a typical commercialized example thereof is a lithium secondary battery. The lithium secondary battery is expected to be applied as a medium/large-sized power source mounted on transportation means (e.g. automobiles) or used for power storage in a power supply network (e.g. smart grid), and also as a compact power source for small IT devices (e.g. smart phones, portable computers, and electronic paper).

When lithium metal is used as a negative electrode material of a lithium secondary battery, there is a risk that a short-circuit or explosion of the battery may occur due to the formation of a dendrite. Therefore, instead of lithium metal, crystalline carbon (e.g. graphite and artificial graphite), soft carbon, hard carbon, and carbon-based active materials to which lithium can be intercalated and deintercalated, are widely used. However, with the expansion of the applications of the secondary battery, there is an increasing demand for higher capacity and higher output from a secondary battery. Accordingly, non-carbon negative electrode materials having a capacity of 500 mAh/g or greater (e.g. silicon (Si), tin (Sn), or aluminum (Al)), which can replace carbon-based negative electrode materials having a theoretical capacity of 372 mAh/g and can be alloyed with lithium, are receiving attention.

Among these non-carbon negative electrode materials, silicon has the largest theoretical capacity, which is about 4,200 mAh/g, and thus the commercialization of silicon is very important in terms of capacity. However, during charging the volume of silicon increases by about four times compared to during discharge, and thus the electrical connection between active materials may be destroyed or the active material may be separated from a current collector due to the volume change during charging and discharging, and the progress of an irreversible reaction (e.g. formation of a solid electrolyte interface (SEI) layer (e.g. $Li_2O$)) due to corrosion of the active material by the electrolyte, and subsequent deterioration in lifetime make the commercialization of silicon difficult. Accordingly, for commercialization of a silicon material, it is required that the capacity and lifetime of a battery be maximized while suppressing the changes in volume during charging and discharging.

DETAILED DESCRIPTION OF THE INVENTION

Technical Problem

Accordingly, a technical object to be solved in the present invention is to provide a negative electrode active material for a secondary battery having high capacity and long lifetime while having high energy density, by improving irreversible capacity and suppressing changes in volume according to charging/discharging, by using silicon.

Additionally, another technical object to be solved in the present invention is to provide a method for preparing a negative electrode active material for a secondary battery having the advantages described above.

Additionally, a further technical object to be solved in the present invention is to provide a lithium battery using the negative electrode active material for a secondary battery having the advantages described above.

Technical Solution

To achieve the above objects, the negative electrode active material according to an embodiment of the present invention may include silicon-based primary particles and the particle size distribution of the silicon-based primary particles may be D10≥50 nm and D90≤150 nm.

The silicon-based primary particles may have sphericity in the range of 0.5 to 0.9.

In another embodiment, the negative electrode active material for a secondary battery may further include a silicon oxide film formed on the silicon-based primary particles. The oxygen content relative to the total weight of the silicon particle cores and the silicon oxide is limited to the range of 9 wt % to 20 wt %. The purity of the silicon-based primary particles may be 99% or greater and the particle distribution width of the silicon-based primary particles may be 1.0 or less.

To achieve the other technical object, the method for preparing a negative electrode active material according to an embodiment of the present invention may include: a step of providing silicon powder; a step of providing a dispersion mixture in which the silicon powder is dispersed in an oxidizing solvent; a step of applying mechanical stress energy (Es) to the silicon powder of the dispersion mixture to form finely granulated silicon particles in which the particle size distribution is D10≥50 nm and D90≤150 nm; and a step of drying the resulting product including the finely granulated silicon particles to obtain silicon-based primary particles. The step of forming the finely granulated silicon particles may be a step of forming a chemical oxide layer on the finely granulated silicon particles by means of the oxidizing solvent while simultaneously applying the mechanical stress energy.

The oxidizing solvent may include water, deionized water, an alcoholic solvent, or a mixture of two or more thereof. The alcoholic solvent may include any solvent selected from the group consisting of ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, and 1,2-hexadecanediol, or a mixture thereof.

The application of mechanical stress energy may be achieved by a mill pulverization process using a composition of abrasive particles along with the oxidizing solvent. The application of mechanical stress energy may be carried out by grinding which performs pressing and abrasion while simultaneously supplying the dispersion mixture between a spinning abrasive plate and a fixed plate. The mechanical stress energy may be defined by the equation below:

$$Es = \frac{\pi * d * V}{60 * \eta}$$

in which π is the ratio of circumference to diameter, d is the diameter of a rotor, V is an RPM, and η is a viscosity.

Advantageous Effects of the Invention

According to an embodiment of the present invention, a negative electrode active material for a secondary battery may be provided, in which an irreversible reaction caused by cracks and/or fractures due to the volume expansion of the silicon-based primary particles is suppressed, by suppressing or reducing tensile hoop stress generated in the lithiated silicon during the charging of the battery by controlling the particle size distribution of the silicon-based primary particles to be D10≥50 nm and D90≤150 nm, thereby enabling the lifetime and capacity of the battery to be improved.

Additionally, according to yet another embodiment of the present invention, a method for preparing a negative electrode active material for a secondary battery may be provided, wherein during the production of the silicon-based primary particles, excessive expansion of the core of the silicon particles during charging/discharging of the battery is prevented and subsequent micronization is prevented while stable formation of a solid electrolyte interface (SEI) is induced, by applying mechanical stress energy in a certain range to finely granulate the silicon powder while simultaneously forming on the core of the silicon particles a silicon oxide layer (hereinafter, a chemical oxide layer) formed on the silicon particles by a wet method using an oxidizing solvent, or controlling the oxygen content within the silicon particles, thus contributing to the improvement of the lifetime of active material particles.

BEST MODE FOR CARRYING OUT THE INVENTION

Figure 1:
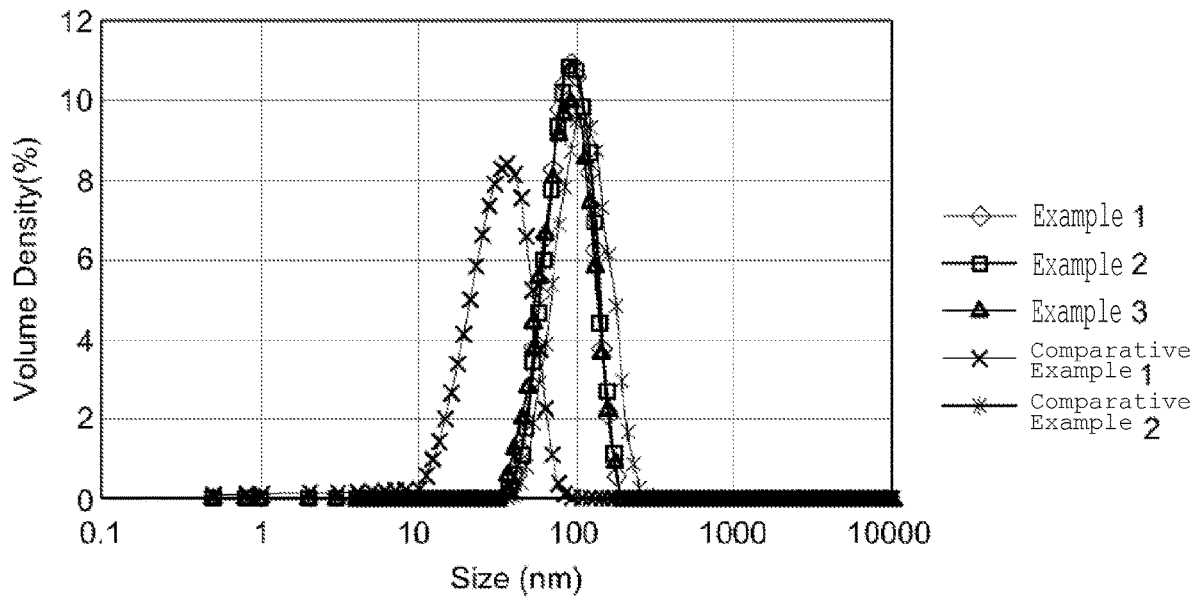
FIG. 1 is a graph showing the comparison results of particle size distribution of silicon-based primary particles according to the examples and comparative examples of the present invention.

Hereinafter, preferred embodiments will be described in detail with reference to accompanying drawings.

Examples of the present invention are provided to more fully describe the present invention to those skilled in the art. The following examples may be modified in various ways, but the scope of the present invention is not limited to these examples described hereinbelow. Rather, these examples are provided so that the present disclosure will be more faithful and complete and fully convey the spirit of the present invention to those skilled in the art.

Additionally, in the drawings, the thickness and size of each layer are exaggerated for convenience and clarity of explanation, and the same reference numerals refer to the same elements in the drawings. As used herein, the term "and/or" includes any and all combinations of any of the listed items.

The terminology used herein is used for the purpose of describing particular embodiments and is not intended to be limiting of the invention. As used herein, the singular forms may include the plural forms as well, unless the context explicitly indicates otherwise. Additionally, it is apparent that the terms "comprise" and/or "comprising," when used in this specification, specify the presence of stated features, integers, steps, operations, members, components, and/or groups thereof, but do not exclude the presence or addition of one or more other features, integers, steps, operations, members, components, and/or groups thereof.

The examples according to the present invention relate to the improvement of the capacity and lifetime of a lithium secondary battery, in which silicon particles are used as a negative electrode active material, by controlling the range of the particle distribution of silicon powder, and to a secondary battery using the same. In general, it is known that when silicon particles are applied to a secondary battery negative electrode, the drastic decrease in lifetime and increase in the irreversible capacity are due to the large volume expansion and contraction of silicon particles during lithiation/delithiation. As such, the present inventors have discovered that when the particle size distribution of the silicon primary particles is prepared so as to be small and uniform within a certain range, it is possible to reduce the phenomenon of the irreversible capacity increasing and the lifetime characteristics deteriorating due to the volume expansion in the negative electrode active material, and thereby the present inventors have derived the present invention.

According to an embodiment of the present invention, a negative electrode active material may include silicon-based primary particles, and the silicon-based primary particles may have a particle size of D10≥50 nm, D90≤150 nm, in which D100 may be less than 250 nm. In the present invention, D10 may be defined as a size of a particle (or particle diameter) corresponding to a volume of 10% on a cumulative size-distribution curve with a total volume of 100%; D90 as a size of a particle (or particle diameter) corresponding to a volume of 90% on the cumulative size-distribution curve; and D100 as a size of a particle (or particle diameter) corresponding to a volume of 100% on the cumulative size-distribution curve, that is, D100 represents the size of the coarsest particle among the distributed particles. When the silicon-based primary particles are prepared so as to have the above particle size distribution range, it is possible to reduce the phenomenon of the irreversible capacity increasing and the lifetime characteristics deteriorating due to the volume expansion in the negative electrode active material.

Additionally, according to an embodiment of the present invention, the median particle diameter of the silicon-based primary particles, D50, represents a particle size (or the cumulative average particle diameter) corresponding to a volume of 50% on the particle size cumulative distribution curve, and D50 may be 80 nm to 100 nm. When the D50 of the silicon-based primary particles is less than 80 nm, the relative proportion of the conductive layer or the conductive material in the form of particles in the active material slurry becomes large and thus the battery capacity is lowered, whereas when the D50 of the particles exceeds 100 nm, the capacity retention is lowered due to the increase of the irreversible capacity.

FIG. 1 is a graph comparing the particle size distribution according to the examples and comparative examples of the present invention. For the definitions of the following Examples 1 to 3 and Comparative Examples 1 and 2 please refer to Tables 1 and 2 shown below.

With reference to FIG. 1, the silicon-based primary particles having a particle size distribution according to the examples of the present invention have a narrower particle distribution width than those of the comparative examples. In general, the particle distribution width may be defined as a value of (D90–D10)/D50. According to an embodiment of the present invention, when the particle distribution width of the silicon-based primary particles is 1 or less, and preferably 0.9 or less, the increase of the irreversible capacity due to the volume expansion can be alleviated within a negative electrode active material, and consequently the lifetime characteristics of a secondary battery can be improved.

It can be seen that Examples 1 to 3 have superior irreversible capacity increases and lifetime characteristics due to the volume expansion in the negative electrode active material, compared to those of Comparative Examples 1 and 2. Accordingly, with respect to Examples 1 to 3, it may be preferred that the particle size distribution of silicon-based primary particles be D10≥50 nm and D90≤150 nm, and that D50 be between 80 nm and 100 nm.

According to an embodiment of the present invention, the silicon-based primary particles may be prepared such that the sphericity, which is defined by Equation 1 below, is in the range of 0.5 to 0.9 or below, and by using the silicon-based primary particles having said sphericity, an irreversible reaction caused by cracks or fractures of the silicon particles during charging of the battery can be suppressed or reduced. Those particles which have a sphericity of less than 0.5 on the thin edge may be micronized by a plurality of charging/discharging operations and thereby the lifetime may deteriorate. In contrast, when the sphericity is greater than 0.9, cracks or fractures are easily caused by the tensile stress applied to the lithiated layer. The formation of an SEI layer is promoted in the silicon-based primary particles exposed by the cracks or fractures, resulting in deterioration of the lifetime of the battery.

$$\text{Sphericity} = \frac{2\sqrt{\pi A}}{p} \qquad \text{[Equation 1]}$$

Here, A is a projected area of the two-dimensionally projected silicon-based primary particles, and P is a perimeter of the two-dimensionally projected silicon-based primary particles. The sphericity of the silicon-based primary particles may be measured from the images obtained from a scanning electron microscope using commercially available software such as ImageJ® (e.g. Imagej136). Alternatively, the sphericity may be measured by an FPIA-3000® flow particle image analyzer manufactured by SYSMEX (Kobe, Japan).

According to another embodiment of the present invention, the silicon-based primary particles may include a core of the silicon particle and a silicon oxide layer encompassing the core. The silicon oxide layer may be a natural oxide layer or may include a chemical silicon oxide or thermal oxide that has been artificially grown using an oxygen-containing solvent (i.e., alcohols, distilled water, or peroxide compounds). The silicon particle core may be polysilicon or a single crystal, and may even have a low degree of crystallinity or may be amorphous. Additionally, the silicon-based primary particles may include not only silicon particles having a purity of 99% or greater capable of maximizing capacity, but also any intermetallic compound of silicon and at least one element selected from the group consisting of tin (Sn), antimony (Sb), zinc (Zn), germanium (Ge), aluminium (Al), copper (Cu), bismuth (Bi), cadmium (Cd), magnesium (Mg), arsenic (As), gallium (Ga), lead (Pb), and iron (Fe). In another embodiment, the silicon particle core (100) may have closed pores therein.

In particular, in the silicon-based primary particles, the oxygen content relative to the total weight of the silicon particle cores and the silicon oxide layer may be in the range of 9 wt % to 20 wt %, and preferably 10 wt % to 17 wt %. Within the above range of oxygen content, both the initial charging rate and the capacity retention characteristics are maintained at 80% or higher, with the result that silicon-based primary particles suitable for commercialization may be provided. When the oxygen content is less than 9 wt %, the effect of suppressing volume expansion is insignificant, and thus the capacity retention of the silicon-based active material complex is reduced to less than 80%, and the lifetime deterioration due to the volume change cannot be improved. However, when the oxygen content exceeds 20 wt %, the capacity retention characteristics are improved, but the initial charging rate may be reduced to less than 80% thus the energy density may deteriorate.

Figure 2:
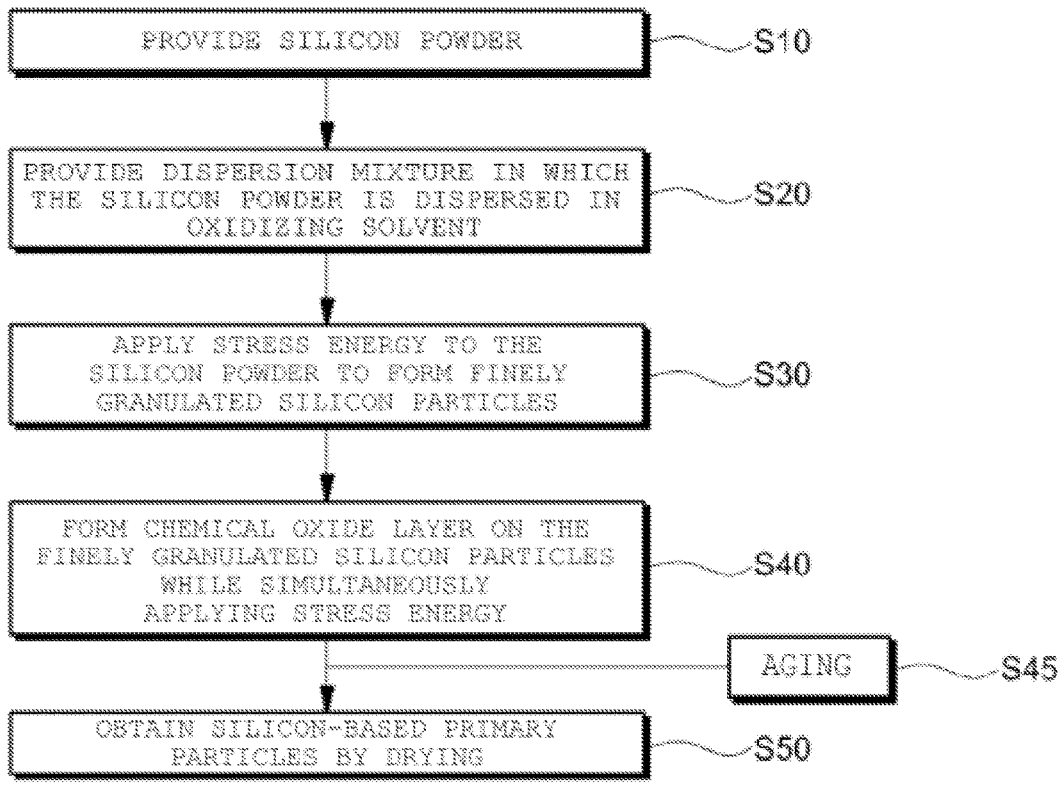
FIG. 2 is a flowchart showing a method of preparing silicon-based primary particles according to an embodiment of the present invention.

FIG. 2 is a flowchart showing a method of preparing silicon-based primary particles according to an embodiment of the present invention.

With reference to FIG. 2, first, silicon powder is provided (S10). The silicon powder is a commercially available granulated particle having an average diameter in the range of a few micrometers to a few thousand micrometers. The silicon powder may be polycrystalline or a single crystal, but the present invention is not limited thereto. A dispersion mixture in which the silicon powder is dispersed in a liquid oxidizing solvent is provided (S20).

In an embodiment, the oxidizing solvent is for forming a chemical oxide layer of silicon and may be water, deionized water, an alcoholic solvent, or a mixture of two or more thereof. The alcoholic solvent may be any solvent selected from the group consisting of ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, and 1,2-hexadecanediol, or a mixture thereof. Preferably, the alcoholic solvent is ethyl alcohol.

Then, to the silicon powder of the dispersion mixture, the mechanical stress energy (Es) defined by Equation 2 below is applied in the range of 9 m/s to 18 m/s and thereby finely granulated silicon particles are formed (S30). Such a fine granulation process is efficient for the production of silicon particles with narrow particle size distribution, and when the pulverization process is performed by applying the stress energy in the above range, fine silicon particles having a narrow particle size distribution can be produced. The silicon-based active material particles according to the examples of the present invention are controlled so as to have a particle size distribution of D10≥50 nm and D90≤150 nm. Additionally, D100 is controlled so as to be less than 250 nm and D50 is controlled so as to have a range of 80 nm to 100 nm.

$$Es = \frac{\pi * d * V}{60 * \eta} \qquad \text{[Equation 2]}$$

(wherein, π is the ratio of circumference to diameter, d is the diameter of a rotor, V is an RPM, and η is a viscosity.)

In an embodiment, the application of stress energy to the silicon powder may be performed by a milling method, in which the dispersion mixture and abrasive particles are charged into a cylindrical or conical container rotating about a central axis and rotated. The abrasive particles may be beads including ceramic particles, metal particles, or a mixture thereof, but the present invention is not limited thereto. The abrasive particles may apply mechanical compression and shear stress to the silicon powder of the dispersion mixture by having an appropriate average size relative to the size of the silicon powder. In another embodiment, the application of mechanical stress energy to the silicon powder may be carried out by grinding which performs pressing and abrasion while simultaneously supplying the dispersion mixture between a spinning abrasive plate and a fixed plate.

In an embodiment, before the step of drying the resulting product, an aging step may be additionally performed to further relieve the stress by further oxidizing the finely granulated silicon particles, by dispersing and stirring the resulting product into any one of the above-mentioned oxidizing solvents or a mixed solution thereof (S45). Through the aging process, the residual stress of the cores and/or a chemical oxide layer of the silicon particles accumulated during the fine granulation process using the prior stress energy is relieved, and a chemical oxide layer is additionally formed to increase the strength of the chemical oxide layer, and thereby the chemical oxide layer may faithfully serve as a clamping layer to enable the suppression of the volume change of the cores of the silicon particles during charging and discharging.

Figure 3:
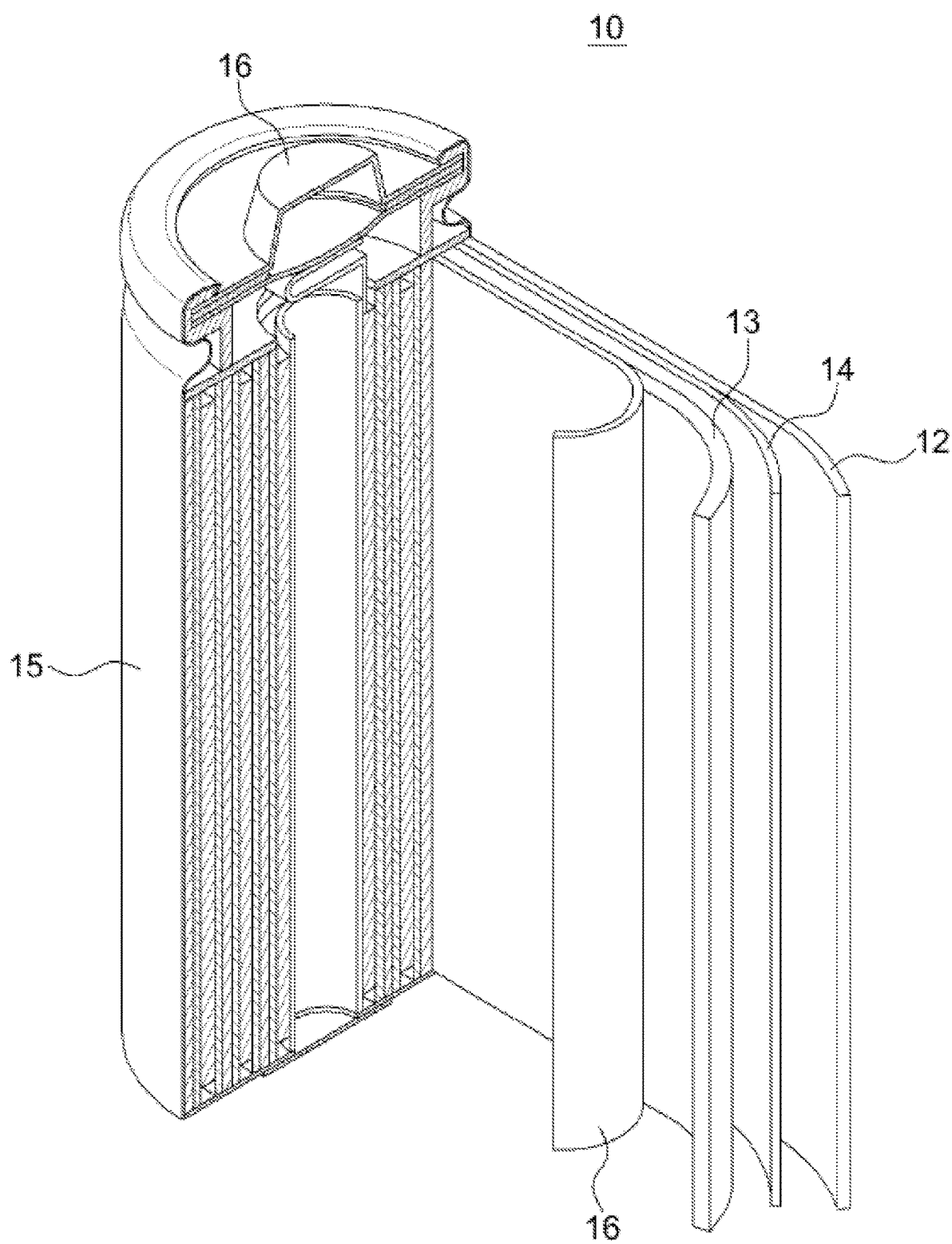
FIG. 3 is a cross-sectional view of an electrode employing silicon-based primary particles according to an embodiment of the present invention.

FIG. 3 is a cross-sectional view of an electrode employing silicon-based primary particles according to an embodiment of the present invention.

With reference to FIG. 3, the lithium battery (10) includes a positive electrode (13), a negative electrode (12), and a separator (14) disposed between the positive electrode (13) and the negative electrode (12). The positive electrode (13), negative electrode (12), and a separator (14) are wound or folded and accommodated in a battery container (15). Then, an electrolyte may be injected into the battery container (15) and it may be sealed with a sealing member (16) and thereby the lithium battery (10) may be completed. The battery container (15) may be cylindrical, square, of thin-film type, etc. The lithium battery may be a lithium ion battery. In particular, the negative electrode (12) may include the negative electrode active material described above.

The lithium battery is suitable for applications requiring high capacity, high output, and high-temperature operation (e.g. electric vehicles) in addition to the applications in conventional mobile phones, portable computers, etc., and the lithium battery may also be used in hybrid vehicles, etc. in combination with a conventional internal combustion engine, a fuel cell, a supercapacitor, etc. In addition, the lithium battery may be used for all other applications requiring high output, high voltage, and high-temperature operation.

MODES FOR CARRYING OUT THE INVENTION

Hereinafter, the present invention will be described in more detail with respect to specific embodiments, but the present invention is not limited to these embodiments.

EXAMPLES

A commercially available polysilicon powder (2 kg) having an average diameter of about 5 μm was dispersed in an oxidizing solvent (10 kg) of 100% ethanol to prepare a dispersion mixture. The bead mill pulverization process in which the stress energy was controlled under the conditions shown in Table 1 was performed to prepare the silicon-based primary particles of the examples and comparative examples, and the sphericity and particle size distribution of the prepared particles are shown in Table 2 below. The purity of the analyzed silicon-based primary particles was greater than 99%. The above preparation method is exemplary and the silicon particles may be prepared by other abrasive processes or by performing the exploding wire method on a bulk silicon material (e.g. silicon rods and wafers).

TABLE 1

| | Rotor Size (cm) | V (rpm) | Viscosity (P) | Milling Time (hr) | Stress Energy (m/s) |
|---|---|---|---|---|---|
| Example 1 | 12.2 | 2500 | 100 | 17.5 | 16.0 |
| Example 2 | 14.4 | 2500 | 200 | 22 | 9.4 |
| Example 3 | 17.8 | 1900 | 100 | 17 | 17.7 |
| Comparative Example 1 | 17.8 | 2500 | 100 | 14 | 23.3 |
| Comparative Example 2 | 5.5 | 4500 | 300 | 33 | 4.3 |

TABLE 2

| | Sphericity | D10 (nm) | D50 (nm) | D90 (nm) | Particle Distribution Width (D90-D10)/D50 |
|---|---|---|---|---|---|
| Example 1 | 0.8 | 50 | 100 | 150 | 1.00 |
| Example 2 | 0.75 | 55 | 95 | 140 | 0.89 |
| Example 3 | 0.76 | 58 | 88 | 130 | 0.82 |
| Comparative Example 1 | 0.5 | 30 | 62 | 105 | 1.21 |
| Comparative Example 2 | 0.4 | 88 | 142 | 257 | 1.19 |

Referring to Tables 1 and 2, as in Examples 1 to 3, when silicon powder is subjected to wet pulverization under stress energy in the range of about 9 m/s to 18 m/s, it can be seen that the sphericity falls within the range of 0.5 to 0.9, and the particle distribution width is less than 1 in the numerical range where D10 is 50 or greater and D90 is 150 or less. Meanwhile, in Comparative Examples 1 and 2, it can be seen that the particle distribution is spread over a relatively wide range and the particle distribution width exceeds 1. Additionally, in Comparative Example 1, it can be seen that when the applied stress energy is too strong, the process time is reduced, but the particle size cannot be controlled so the particle distribution width exceeds 1, whereas in Comparative Example 2, it is shown that when the stress energy is reduced, the desired particle size distribution cannot be obtained even after a considerable milling time.

Table 3 below evaluates the initial efficiency and proportion of capacity retention of half cells, in which silicon-based primary particles having the sphericity and particle size distribution of Table 2 prepared according to examples and comparative examples were slurried to prepare negative electrodes. The capacity retention results are those evaluated after 50 charging/discharging cycles. The reference initial capacity is 4,200 mAh/g, which is the theoretical capacity of silicon.

TABLE 3

| | Particle Distribution Width | Sphericity | Initial Efficiency | Weight Ratio Capacity | Retention @ 50 Cycles |
|---|---|---|---|---|---|
| Example 1 | 1.00 | 0.8 | 88% | 2455 mAh/g | 95% |
| Example 2 | 0.89 | 0.75 | 89% | 2387 mAh/g | 96% |
| Example 3 | 0.82 | 0.76 | 90% | 2410 mAh/g | 98% |
| Comparative Example 1 | 1.21 | 0.6 | 83% | 2040 mAh/g | 74% |
| Comparative Example 2 | 1.19 | 0.5 | 80% | 2148 mAh/g | 71% |

Referring to Table 3, comparison of Examples 1, 2, and 3 and Comparative Examples 1 and 2 shows that the initial efficiencies were all maintained at levels above 80%, which are levels enabling commercialization, and the capacity to weight ratio was also shown to be 2,000 mAh/g or greater. From the aspect of capacity retention, the initial efficiencies were reduced to less than 75% in the case of particles where the particle distribution width exceeded 1. The initial efficiencies were maintained at levels above 95% in the case of particles where the particle distribution width was less than 1 and the sphericity was in the range of 0.7 to 0.8. The improvement in lifetime characteristics was due to the ability to alleviate the increase of irreversible capacity due to volume expansion in a negative electrode active material when the particle size distribution of the silicon primary particles used as the negative electrode active material was prepared so as to be small and uniform within a certain range.

The present invention described above is not limited to exemplary embodiments and accompanying drawings thereof, and it will be apparent to those of ordinary skill in the art that various substitutions, modifications, and changes can be made hereto without departing from the technical concept of the present invention defined in the following claims.

| <Description of Reference Numerals > | |
|---|---|
| 10: lithium battery | 13: positive electrode |
| 12: negative electrode | 14: separator |
| 15: battery container | 16: sealing member |

The invention claimed is:

1. A negative electrode active material for a secondary battery, wherein the negative electrode active material comprises silicon-based primary particles,
a particle size distribution of the silicon-based primary particles is 50 nm≤D10<80 nm, 80 nm≤D50 (median particle diameter)≤100 nm, and 105 nm<D90≤150 nm,
the particle size distribution width (D90−D10)/D50 of the silicon-based primary particles is 1.0 or less,
circularity of the silicon-based primary particles is in a range of 0.6 to 0.8, wherein the circularity is defined as:

$$\text{circularity} = \frac{2\sqrt{\pi A}}{P}$$

where A is a projected area of the two-dimensionally projected silicon-based primary particles, and P is a perimeter of the two-dimensionally projected silicon-based primary particles, and
wherein the silicon-based primary particles comprise a silicon particle core and a silicon oxide layer formed on the core.

2. The negative electrode active material of claim 1, wherein in the silicon-based primary particles the oxygen content relative to the total weight of the silicon particle core and the silicon oxide layer is limited to the range of 9 wt % to 20 wt %.

3. The negative electrode active material of claim 2, wherein in the silicon-based primary particles the oxygen content relative to the total weight of the silicon particle core and the silicon oxide layer is limited to the range of 10 wt % to 17 wt %.

4. The negative electrode active material of claim 1, wherein purity of the silicon-based primary particles is 99% or greater.

5. The negative electrode active material of claim 1, wherein the particle size distribution width of the silicon-based primary particles is 0.9 or less.

6. The negative electrode active material of claim 1, wherein the D100 particle size of the silicon-based primary particles is less than 250 nm.

7. The negative electrode active material of claim 1, wherein 130 nm≤D90≤150 nm.

8. The negative electrode active material of claim 1, wherein the silicon particle core is polycrystalline or amorphous.

* * * * *